Feb. 26, 1952

G. P. BENTLEY ET AL 2,587,433

STEREOPTICON PHONOGRAPH

Filed March 25, 1948

2 SHEETS--SHEET 1

INVENTORS
GEORGE P. BENTLEY,
FRANK R. HOUSE
BY
Herbert D. Thompson
THEIR ATTORNEY INVENTORS
GEORGE P. BENTLEY,
FRANK R. HOUSE
BY Herbert H. Thompson
THEIR ATTORNEY Patented Feb. 26, 1952

2,587,433

UNITED STATES PATENT OFFICE 2,587,433

STEREOPTICON PHONOGRAPH

George P. Bentley, Garden City, and Frank R. House, Baldwin, N. Y., assignors to Instrument Development Laboratories, Inc., Williston Park, N. Y., a corporation of New York Application March 25, 1948, Serial No. 17,066

13 Claims. (Cl. 88—27)

This invention relates to a combined phonograph and stereopticon, which may be made in the form of an attachment for ordinary phonographs. Recently, children's phonograph records have become popular in which the childhood stories are recorded on phonograph records, sometimes in a series of records, and an object of the present invention is to furnish additional entertainment by showing in succession a series of pictures on a screen illustrative of the story being transcribed. Obviously, our invention also has broad application in the field of sound-pictures.

According to our invention a succession of pictures is affixed to each record, say between 10 and 50, preferably in colors and each picture is held on the screen a sufficient time for the observer to comprehend and appreciate it. Preferably, each picture is arranged to stay on the screen for at least one and preferably a plurality of revolutions of the record. To accomplish this purpose, we provide on one surface of the phonograph disc, preferably near the center inside of the sound track, a plurality of concentrically arranged pictures together with a novel optical and indexing system, whereby each picture in succession is magnified and shown on the screen for a predetermined number of revolutions of the record, and is held stationary on the screen during that time regardless of the revolutions of the record.

The picture projecting mechanism may be located either above or below the record. If below, the pictures on the underside correspond to the record on the upperside of the record, and vice versa.

A convenient form of picture to use is ordinary 8 mm. motion picture film, each picture being pasted around a concentric circle on the phonograph record. While in our invention we may project the light beam through the film, we prefer to show the picture by reflected light and for this purpose, preferably coat the back of the film with aluminum or other reflecting coating before it is pasted on the face of the record.

Referring to the drawings in which a preferred form of our invention is shown,

Figures 1, 6:
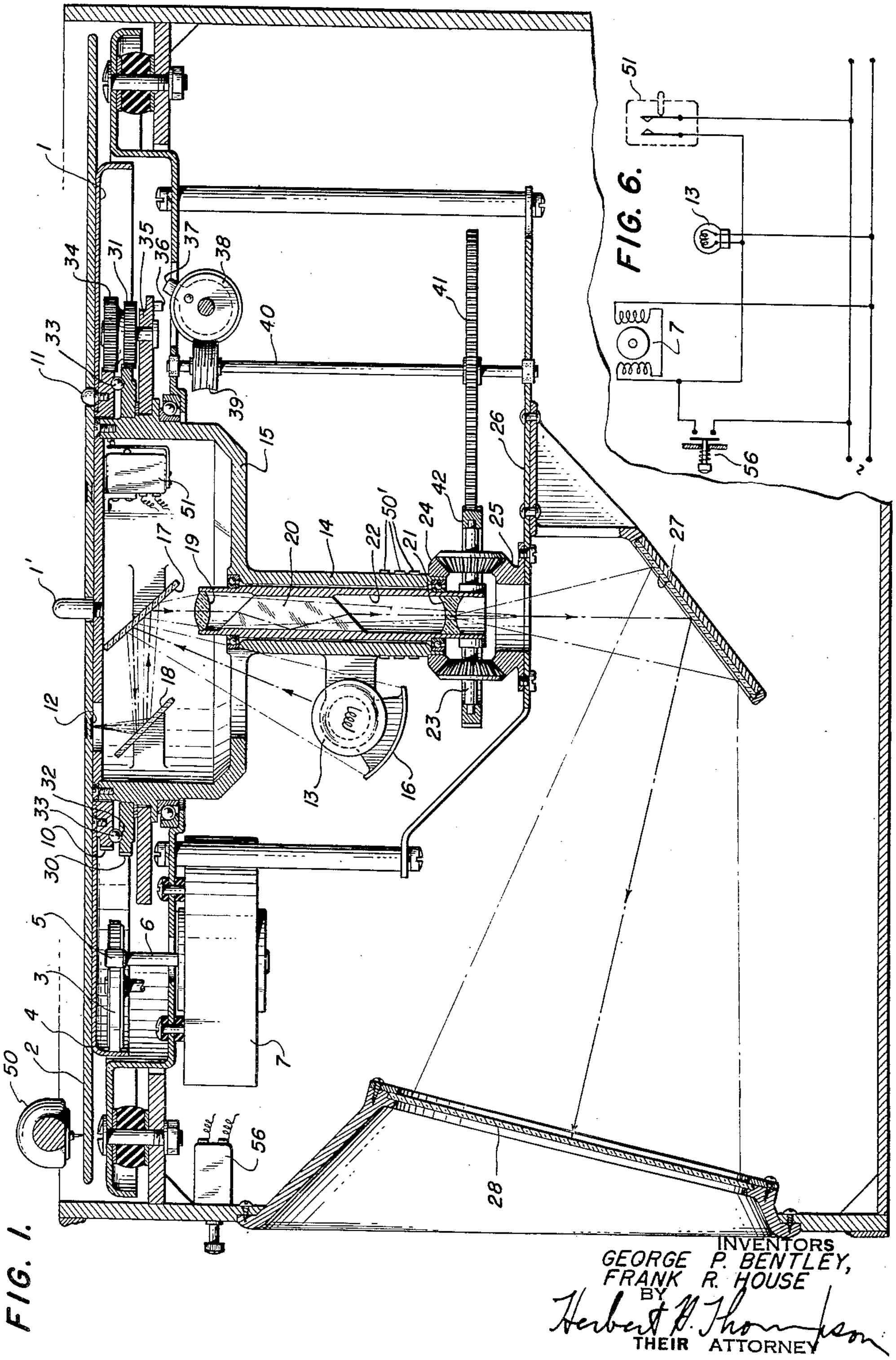
Fig. 1 is a vertical section through a typical phonograph mechanism with our improvement incorporated therein.
Fig. 6 is a simplified wiring diagram of the electric circuits involved.

In the drawings we have represented the conventional turntable 1 with centerpost 1' for the phonograph record 2, the turntable being rotated by the friction wheel 3 which engages the inner periphery of the turned down edge 4 of the turntable in the usual manner. A sound pick-up or tone arm is indicated generally at 50. Wheel 3 is shown driven from the friction pulley 5 on the shaft 6 of the driving motor 7. The turntable is shown as secured to the upper face of an annular gear 10 and is provided with an indexing stud 11, so that the record always starts on the first picture of the series. The series of small pictures on the underneath side of the phonograph record is shown at 12 and each picture is illuminated in succession from a light source 13, preferably mounted on a sleeve 14 secured to a hollow hub member or projection head 15. A reflector 16 may be provided for the light source 13 to direct the beam successively on mirrors 17 and 18 mounted within the hub 15 and thence to the picture 12, the angle of incidence not being normal to the picture so that the reflected rays will be directed at a slight angle to the direct rays from the lamp 13, the reflected image passing from mirror 18 to mirror 17 and vertically downward through a convex lens 19. In the path of these rays is placed a series of reflectors which may be in the form of a dove prism 20, and a concave lens 21, which optics performs the function of eliminating the effect of the rotation of the record and its turntable from the projected picture, so that the picture will remain still on the screen as long as it is in focus.

For this purpose, means are provided to rotate the dove prism at one-half the speed of the turntable. This may be accomplished by journalling the mounting sleeve 22 for the dove prism and associated lenses 19 and 21 within the sleeve 14 and driving the sleeve from the planetary arm 23 of a planetary gearing arrangement 23, 24, 25. Another arm of the train comprises bevel gear 24 keyed to the bottom of the sleeve 14 and the third arm is the stationary bevel gear 25 fixed in the framework 26 of the mechanism. After being reflected and doubly refracted within the dove prism, the image falls on the reflector 27 and is projected onto the viewing screen 28. Slip rings 50′ are shown on sleeve 14 for leading in current to lamp 13 and to switch 51.

The mechanism so far described will hold one picture on the screen until changed. To effect sequential changes, we provide an indexing mechanism for causing the picture viewed in the optical system to be shifted to the next picture on the disc after each revolution or predetermined number of revolutions of the record. For this purpose, we have shown the hub or member 15 as provided with an annular gear 30 which meshes with a pinion 31. On the face of annular gear 30 is a series of depressions or detents 32 each containing a ball 33. On said balls rotatably rests the gear 10 which carries the turntable 1, but is free to rotate with respect to the member 15, except for the releasable coupling formed by the series of balls 33 normally resting in depression 32 in the face of gear 30 and corresponding depression in the bottom of gear 10. The gear 10 is shown as meshing with a pinion 34 fixed to the pinion 31. Pinion 31 is provided with a slightly different number of teeth than pinion 34, say one less tooth than the pinion 34, so that when gear 10 is driving gear 30 through the pinions 31 and 34 (as hereinafter described) the gear 30 and the connected hub 15 will be turned through a less (or greater) angle than the gear 10 for one revolution of said gear, thereby bringing the light beam to bear upon the next picture on the disc. Also mounted on the hub 15 is a large ring 35 in which the pinions 31 and 34 are journalled and which is also provided with a lug 36. Said lug is adapted to be engaged once every predetermined number of revolutions, say every 10 or 15 revolutions of the turntable, by a rotatable cooperating stop 37 mounted on or driven by a worm gear 38. Worm wheel 38 may be conveniently rotated at slow speed from a worm 39 driven from a shaft 40 on which is mounted a gear 41 driven from the gear 42 forming the planetary arm 23 of the planetary gearing 23, 24, 25. When the two stops 36 and 37 are not engaged, the two gears 10 and 30 turn together without relative displacement, gear 30 being driven from 10 through the balls 33, and the same picture remains in focus. Ring 35 is also carried around with pinions 31 and 34 acting like planetary gears and not being rotated on their own axes. When, however, the lug 36 is engaged by the stop pin 37, the platform 35 is temporarily arrested in its revolution with hub 15, thereby causing the gear 10 to drive gear 30 through the pinions 31 and 34 for one revolution of the record, during which time gear 30 and hub 15 will fall behind the gear 10 and the attached turntable 1 by the width of one frame, due to the less number of teeth in pinion 31. If, for instance, the width of one frame is 18° or $\frac{1}{20}$ of a circle, pinion 34 should have enough teeth to rotate 20 times for each rotation of the turntable, so that gear 30 will fall behind (or be advanced) 18° for one revolution.

Figures 2, 3, 4, 5:
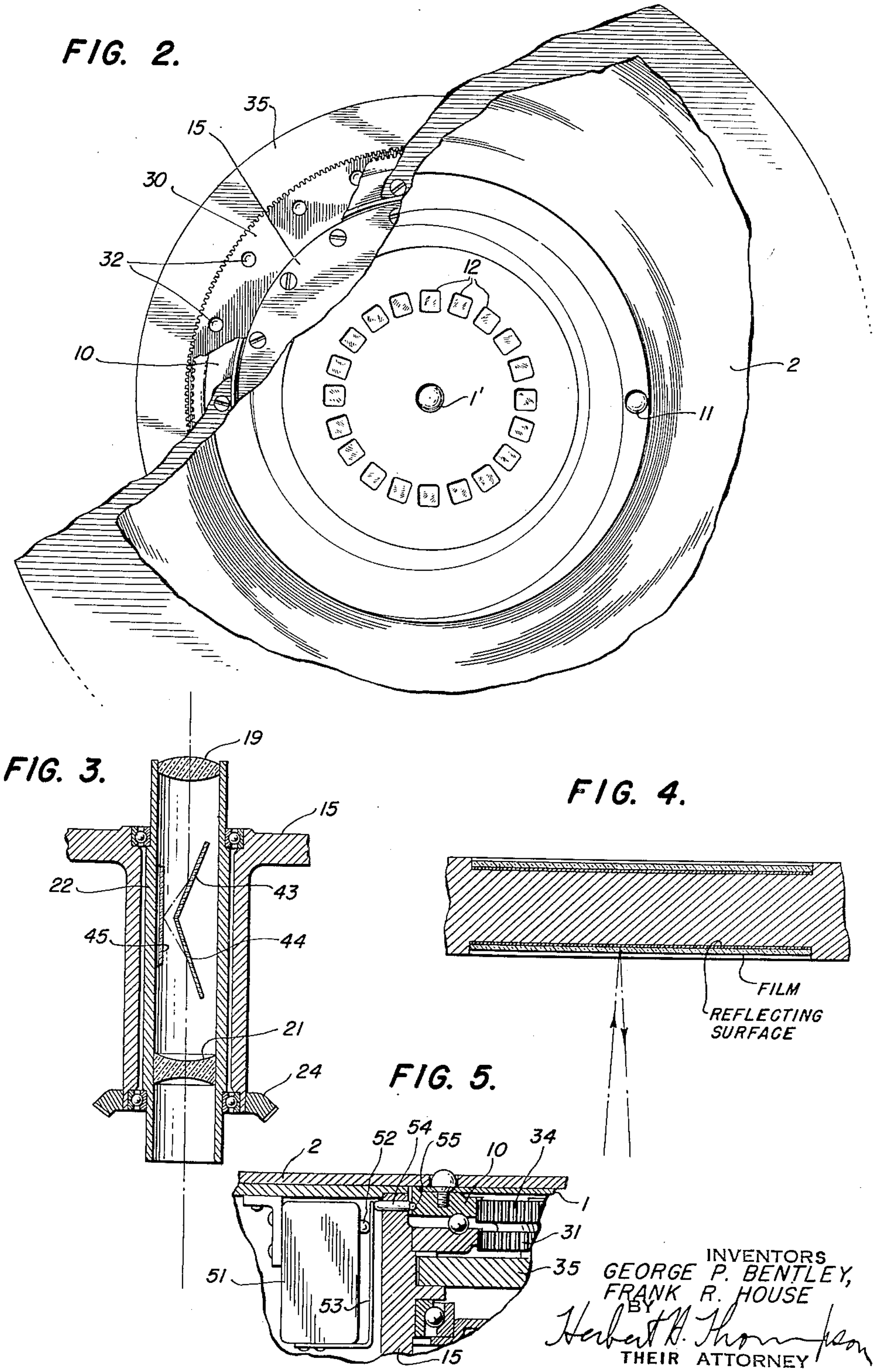
Fig. 2 is a plan view of a record broken away to show parts underneath.
Fig. 3 is a vertical section of a modified form of reflecting system for the optics.
Fig. 4 is an enlarged sectional detail of a record with film pasted on each side with a reflecting backing.
Fig. 5 is a sectional detail of a stop switch for stopping the record and pictures at the end thereof.

Fig. 3 shows a slightly different form of optics from Fig. 1, the dove prism arrangement being replaced by three mirrors 43, 44 and 45.

From the foregoing the simple operation of our invention will be apparent. Once the record is placed on the turntable and positioned by the pin 11, the phonograph may be started and the light turned on by a suitable switch (not shown). The machine will then operate to produce the story or music recorded with appropriate stereopticon pictures, which are changed every predetermined number of revolutions until the end of the record is reached. It is obvious that our invention is equally well adapted to a phonograph with an automatic record changer or that the picture projecting mechanism may be placed above instead of below the record if desired within the spirit of our invention.

If the phonograph is equipped with an automatic record changer, it may be desirable to provide an automatic throwout switch to insure that the phonograph keeps turning until the last picture has been shown and the turntable is in a position to start on the first picture of the sequence when the record is again played. For this purpose, we have shown a switch box 51 secured within the projection head 15 having a small plunger 52 (Fig. 5) normally resting against a flat spring arm 53 which in turn bears against the slidable pin 54 having a rounded end normally riding on the inner periphery of the ring gear 10. Said ring gear is provided with a notch 55 which the pin enters after the gear and the projection head 15 have completed one complete relative revolution, or in other words, after the record has finished playing and the picture frames are back to the number one picture. This movement of the pin permits switch 51 to open so as to stop the motor 7 and extinguish lamp 13. The switch which starts the phonograph and moves the tone arm 50 to engage the record is preferably placed in parallel to switch 51, so that the former will start the record even though switch 51 may be open. A slight turning of the turntable 1 will close switch 51 and the record will therefore continue to play even though the tone arm or starting switch may be opened before the record is finished, since switch 51 will remain closed until the record is completed. Such a switch 51 may also be used without an automatic record changer in which case an extra push button 56 would be provided in parallel with switch 51 (see Fig. 6) which is pressed for a short time only to start the record after which it is released. The record will then play until it is completed and the single picture shown, when the motor will stop and the lamp will be extinguished.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

We claim:

1. A stereopticon phonograph comprising a turntable for a phonograph record having a series of pictures arranged around a face thereof, and optical means for projecting each picture in turn on a screen including rotatable image reflecting means, a member normally rotatable with the turntable, and carrying at least a part of said reflecting means, means for rotating a portion of said optical means other than said reflecting means from said turntable at half the speed thereof, and means for changing the relation between said turntable and member substantially by the arc occupied by one picture, upon a predetermined number of revolutions of the turntable, whereby each picture remains on the screen for such number of revolutions, and is then replaced by the next picture.

2. A stereopticon phonograph comprising a turntable for a phonograph record having a series of transparencies around the face thereof, each with a reflecting backing, a member normally rotatable with said turntable, a light beam directing means on said member for illuminating each of said pictures in sequence, and optical means for projecting each picture as illuminated on a screen during at least one revolution of the turntable including rotatable image reflecting means driven by said member, and means for changing the relation between said turntable and member substantially by the arc occupied by one picture upon at least one revolution of the turntable.

3. A stereopticon apparatus adapted to present a series of stills in succession comprising a disc having a plurality of pictures arranged concentrically around the same, means for rotating said disc continuously, a member normally rotatable with said turntable, a light beam directing means for illuminating each of said pictures in sequence, and optical means for projecting each picture as illuminated on a screen for at least one revolution of the disc including rotatable image reflecting means, at least a portion of which is on said member and means for changing the relation between said turntable and member substantially by the arc occupied by one picture upon at least one revolution of the turntable.

4. A stereopticon apparatus adapted to present a series of stills in succession comprising a disc having a plurality of pictures arranged concentrically around the same, means for rotating said disc continuously, a light beam directing means for illuminating each of said pictures in sequence, and optical means for projecting each picture as illuminated on a screen including rotatable image reflecting means, and means for rotating said reflecting means at half the speed of the turntable, a member normally rotatable with the turntable and carrying said light beam means, and means for changing the relation between said turntable and member substantially by the arc occupied by one picture, upon a predetermined number of revolutions of the turntable, whereby each picture remains on the screen for such number of revolutions, and is then replaced by the next picture.

5. A stereopticon phonograph comprising a turntable for a phonograph record having a series of pictures arranged around a face thereof, a member normally rotatable with said turntable, a light beam directing means on said member for illuminating each of said pictures in sequence, optical means driven by said member for projecting each picture as illuminated on a screen including rotatable image reflecting means, means for changing the relation between said turntable and member substantially by the arc occupied by one picture upon at least one revolution of the turntable and automatic means for stopping the phonograph and shutting off said light only upon completion of the record and series of pictures.

6. A stereopticon phonograph comprising a turntable for a phonograph record having a series of pictures arranged around a face thereof, a member normally rotatable with said turntable, a light beam directing means on said member for illuminating each of said pictures in a predetermined sequence, and optical means driven by said member for projecting each picture as illuminated on a screen, means for changing the relation between said turntable and member after a predetermined number of revolutions of the turntable and automatic means for stopping the phonograph and shutting off said light only upon completion of the record and series of pictures.

7. A stereopticon phonograph comprising a turntable for a phonograph record having a series of still pictures arranged around a face thereof correlated to the sound record, a light beam directing means for illuminating each of said pictures in sequence during at least almost a complete revolution of the turntable, optical means for projecting each picture during the period of illumination on a screen including image reflecting means, means for rotating a portion of said reflecting means as the turntable rotates to keep the same picture on the screen during one revolution, and means for changing the relation between said turntable and said image reflecting means substantially by the arc occupied by one picture upon at least one revolution of the turntable.

8. A stereopticon apparatus adapted to present a series of stills in succession comprising a disc having a plurality of pictures arranged around the same, means for rotating said disc continuously, a light beam directing means for illuminating each of said pictures in sequence, means for normally rotating said beam directing means from said disc rotating means, a stop for interrupting the rotation of said beam directing means for a short period after a predetermined number of revolutions, rotatable optical means for projecting each picture on a screen and means for rotating said optical means from said beam directing means at half the speed thereof.

9. A stereopticon apparatus as claimed in claim 8, in which the means for rotating said directing means includes sun and planet gearing, said stop striking the planet gearing sequentially.

10. A stereopticon apparatus as claimed in claim 3, also having a manual switch for starting, an auxiliary switch in parallel therewith, means for closing said auxiliary switch upon initial rotation of said disc and means for opening said switch after the required number of rotations thereof.

11. A stereopticon phonograph comprising a turntable for a phonograph record having a series of pictures arranged around a face thereof, a member normally rotatable with the turntable, a light beam directing means for illuminating each of said pictures in sequence and rotated with said member, optical means for projecting each picture as illuminated on a stationary screen including rotating image reflecting and focusing means, means for rotating at least a portion of said last-named means at half the speed of said member and another portion thereof with said member, and means for changing the relation between said turntable and member substantially by the arc occupied by one picture upon a predetermined number of revolutions of the member whereby each picture remains on the screen for such number of revolutions and is then replaced by the next picture.

12. A stereopticon phonograph comprising a turntable for a phonograph record having a series of pictures arranged around a face thereof, a member normally rotated by and with said turntable, a light beam directing means rotated by said member for illuminating each of said pictures in a predetermined sequence during at least a predetermined number of revolutions of the turntable, optical means also rotated by said member for projecting each picture as illuminated on a stationary screen, a portion of said light directing and optical means being common to the two, and automatic means for sequentially changing the relation between said turntable and member after each of said predetermined number of revolutions of the turntable, whereby each picture remains on the screen for such number of revolutions after which the next picture appears.

13. A stereopticon phonograph comprising a turntable for a phonograph record having a series of transparencies around the face thereof, each with a reflecting backing, a member normally rotatable with said turntable, a light beam directing means including reflecting means mounted thereon for illuminating one of said pictures during at least one revolution of the turntable, optical means for projecting the reflection of each illuminated picture on a stationary screen including a portion of the aforesaid directing means, the axis of the light directing and image reflecting rays being at a slight angle to one another, and automatic means also driven by said member for changing the relation between said turntable and member after such revolution or revolutions to cause the next picture in sequence to be illuminated and projected on the screen.

GEORGE P. BENTLEY.
FRANK R. HOUSE.

REFERENCES CITED

The following references are of record in the file of this patent:

UNITED STATES PATENTS

| Number | Name | Date |
|---|---|---|
| 745,218 | Mensing | Nov. 24, 1903 |
| 1,584,708 | Billing | May 11, 1926 |
| 1,658,030 | Adams | Feb. 7, 1928 |
| 1,679,708 | Bullis | Aug. 7, 1928 |
| 1,710,677 | Cawley | Apr. 23, 1929 |
| 1,354,864 | Semenitz | Apr. 19, 1932 |
| 1,864,519 | Boularan | June 28, 1932 |
| 1,929,173 | Koch | Oct. 3, 1933 |
| 1,933,057 | Harkin | Oct. 31, 1933 |
| 2,173,768 | Sabol et al. | Sept. 19, 1939 |
| 2,250,298 | Ditty et al. | July 22, 1941 |
| 2,266,741 | Crane et al. | Dec. 23, 1941 |
| 2,314,417 | Neal | Mar. 23, 1943 |
| 2,346,472 | Contner | Apr. 11, 1944 |
| 2,377,476 | Berglund | June 5, 1945 |

FOREIGN PATENTS

| Number | Country | Date |
|---|---|---|
| 484,799 | Great Britain | May 10, 1938 |